United States Patent
Lee

(10) Patent No.: US 11,818,675 B2
(45) Date of Patent: Nov. 14, 2023

(54) OPERATING METHOD OF COMMUNICATION DEVICE AND SIGNAL PROCESSOR INCLUDED IN THE COMMUNICATION DEVICE

(71) Applicant: Samsung Electronics Co., Ltd., Suwon-si (KR)

(72) Inventor: Hae Chul Lee, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/773,238

(22) Filed: Jan. 27, 2020

(65) Prior Publication Data

US 2021/0014809 A1 Jan. 14, 2021

(30) Foreign Application Priority Data

Jul. 11, 2019 (KR) .................. 10-2019-0083670

(51) Int. Cl.
*H04W 56/00* (2009.01)
*H04L 5/00* (2006.01)
*H04J 11/00* (2006.01)
*H04B 17/318* (2015.01)
*H04W 72/30* (2023.01)

(52) U.S. Cl.
CPC ........ *H04W 56/002* (2013.01); *H04B 17/318* (2015.01); *H04J 11/0069* (2013.01); *H04L 5/0051* (2013.01); *H04W 72/30* (2023.01)

(58) Field of Classification Search
CPC .............. H04W 56/002; H04W 72/005; H04L 5/0051; H04L 5/0048; H04J 11/0069; H04B 17/318
See application file for complete search history.

(56) References Cited

U.S. PATENT DOCUMENTS

| | | | |
|---|---|---|---|
| 7,693,123 B2 | 4/2010 | Rudolf | |
| 9,451,569 B1* | 9/2016 | Xiao | .................... H04J 11/0076 |
| 9,820,272 B1* | 11/2017 | Parvazi | ................ H04J 11/0089 |
| 9,924,493 B1 | 3/2018 | Govindassamy et al. | |
| 10,277,349 B1* | 4/2019 | Kotecha | ............... H04J 11/0086 |
| 2014/0018072 A1* | 1/2014 | Wei | ........................ H04W 48/16 455/434 |

(Continued)

FOREIGN PATENT DOCUMENTS

| | | |
|---|---|---|
| CN | 109996265 A | 7/2019 |
| JP | 5525905 | 6/2014 |

(Continued)

OTHER PUBLICATIONS

62775698,Specification (Year: 2018).*
Chinese Office Action dated Aug. 31, 2023 for corresponding CN Patent Application No. 202010574195.6.

*Primary Examiner* — Yu-Wen Chang
(74) *Attorney, Agent, or Firm* — Harness, Dickey & Pierce, P.L.C.

(57) ABSTRACT

An operating method of a communication device includes storing a first part of a synchronization signal received from a cell as a first signal sample in first and second consecutive synchronization signal periods, determining a synchronization signal-reference signal received power (SS-RSRP) estimation candidate within the first and second consecutive synchronization signal periods based on the first signal sample, and performing an SS-RSRP estimation operation on the SS-RSRP estimation candidate.

20 Claims, 12 Drawing Sheets

(56) References Cited

U.S. PATENT DOCUMENTS

| | | | |
|---|---|---|---|
| 2015/0282055 A1* | 10/2015 | Pu | H04J 11/0073 |
| | | | 455/434 |
| 2016/0308637 A1* | 10/2016 | Frenne | H04L 27/2613 |
| 2017/0280374 A1* | 9/2017 | Hayes | H04W 56/0015 |
| 2017/0311353 A1* | 10/2017 | Liu | H04B 7/063 |
| 2018/0084593 A1* | 3/2018 | Chen | H04L 5/0048 |
| 2018/0213493 A1* | 7/2018 | Chakraborty | H04L 1/1692 |
| 2018/0248640 A1 | 8/2018 | Wei | |
| 2018/0270770 A1* | 9/2018 | Shim | H04J 11/0083 |
| 2018/0368054 A1* | 12/2018 | Sheng | H04L 5/0048 |
| 2019/0045559 A1* | 2/2019 | Huang | H04W 72/046 |
| 2019/0166611 A1* | 5/2019 | Noh | H04W 72/1273 |
| 2019/0268947 A1* | 8/2019 | Zhang | H04W 74/0833 |
| 2019/0306820 A1* | 10/2019 | Jiang | H04W 56/00 |
| 2020/0107275 A1* | 4/2020 | Cho | H04B 7/0695 |
| 2020/0120756 A1* | 4/2020 | Wang | H04W 24/10 |
| 2020/0146107 A1* | 5/2020 | Xiong | H04W 76/27 |
| 2020/0187185 A1* | 6/2020 | Zhu | H04B 7/0617 |
| 2020/0196254 A1* | 6/2020 | Kerhuel | H04L 5/0048 |
| 2020/0204237 A1* | 6/2020 | Zhou | H04B 7/0695 |
| 2020/0280940 A1* | 9/2020 | Kim | H04L 5/0051 |
| 2020/0305098 A1* | 9/2020 | Kim | H04W 72/0446 |
| 2020/0359358 A1* | 11/2020 | Ohara | H04W 72/04 |
| 2021/0176687 A1* | 6/2021 | Ko | H04L 5/005 |
| 2021/0258841 A1* | 8/2021 | Cai | H04W 24/10 |
| 2021/0306060 A1* | 9/2021 | Matsumura | H04B 7/088 |

FOREIGN PATENT DOCUMENTS

| | | |
|---|---|---|
| KR | 10-0652373 | 8/2005 |
| KR | 10-2019-0018659 | 2/2019 |
| WO | WO-2018231553 A2 | 12/2018 |

* cited by examiner

OPERATING METHOD OF COMMUNICATION DEVICE AND SIGNAL PROCESSOR INCLUDED IN THE COMMUNICATION DEVICE

This application claims priority to Korean Patent Application No. 10-2019-0083670, filed on Jul. 11, 2019, and all the benefits accruing therefrom under 35 U.S.C. § 119, the disclosure of which is incorporated herein by reference in its entirety.

BACKGROUND

1. Field

The present disclosure relates to an operating method of a communication device and a signal processor included in the communication device.

2. Description of the Related Art

There is a growing interest in Fifth Generation (5G) (or New Radio) communication systems. Since it is difficult to secure ultra-wide frequencies of 100 MHz or higher in the band of frequencies of hundreds of MHz or several GHz, normally used by existing Long-Term Evolution (LTE) and LTE-Advanced (LTE-A) communication systems, a method is being considered in which signals are transmitted using a wide band of frequencies of 6 GHz or higher. Specifically, 5G communication systems can increase transmission rate using a millimeter wave band such as a 28 GHz band or a 60 GHz band.

5G communication systems use beamforming to increase the reach of radio waves. Accordingly, communication devices using a 5G communication system search for and find a cell that provides communication services during a cell search, search for a transmission beam that matches a beam received by a terminal from among a plurality of transmission beams formed by the found cell, and measure the strength of signals received from the found cell.

SUMMARY

Embodiments of the present disclosure provide an operating method of a communication device with an improved operating performance.

Embodiments of the present disclosure also provide a signal processor with an improved operating performance.

However, embodiments of the present disclosure are not restricted to those set forth herein. Embodiments of the present disclosure will become more apparent to one of ordinary skill in the art to which the present disclosure pertains by referencing the detailed description of the present disclosure given below.

According to an embodiment of the present disclosure, there is provided an operating method of a communication device including storing a first part of a synchronization signal received from a cell as a first signal sample in first and second consecutive synchronization signal periods, determining a synchronization signal-reference signal received power (SS-RSRP) estimation candidate within the first and second consecutive synchronization signal periods based on the first signal sample, and performing an SS-RSRP estimation operation on the SS-RSRP estimation candidate.

According to embodiments of the present disclosure, there is provided an operating method of a communication device including storing a synchronization signal received from a cell as a first signal sample in a first cell search period, is the first cell search period being shorter than a synchronization signal block (SSB) burst set period, storing the synchronization signal as a second signal sample in a second cell search period different from the first cell search period, the second cell search period being shorter than the SSB burst set period, determining a synchronization signal-reference signal received power (SS-RSRP) estimation candidate based on the first signal sample during the second cell search period contemporaneous with the storing the synchronization signal as a second signal sample, storing data for performing SS-RSRP estimation on the SS-RSRP estimation candidate, and performing an SS-RSRP operation on the SS-RSRP estimation candidate.

According to embodiments of the present disclosure, there is provided an operating method of a communication device including storing a synchronization signal received from a cell in a first buffer as a first signal sample in a first cell search period, the synchronization signal including an synchronization signal block (SSB), the first cell search period occurring during a first SSB burst set period longer than the first cell search period, performing a primary synchronization signal (PSS) search on the first signal sample during the first cell search period; storing the synchronization signal in a second buffer as a second signal sample in a second cell search period, the second buffer being different from the first buffer, the second cell search period occurring during the first SSB burst set period, the second cell search period occurring after the first cell search period, performing a PSS search on the second signal sample during the second cell search period, performing a secondary synchronization signal (SSS) search on the first signal sample during the performing a PSS search on the second signal sample, determining a synchronization signal-reference signal received power (SS-RSRP) estimation candidate based on a result of the performing a SSS search on the first signal sample, and performing SS-RSRP estimation on the SS-RSRP estimation candidate based on physical broadcast channel (PBCH) data.

According to embodiments of the present disclosure, there is provided a signal processor including a first buffer configured to store a first part of a synchronization signal received from a cell as a first signal sample, a second buffer configured to store a second part of the synchronization signal as a second signal sample, the second buffer being different from the first buffer, and processing circuitry configured to, determine synchronization signal-reference signal received power (SS-RSRP) estimation candidate information based on a cell search performed using the first buffer and the second buffer, the SS-RSRP estimation candidate information including information regarding an SS-RSRP estimation candidate, detect an index of the SS-RSRP estimation candidate based on the SS-RSRP estimation candidate information, and perform SS-RSRP estimation on the SS-RSRP estimation candidate based on the SS-RSRP estimation candidate information.

Other features and embodiments may be apparent from the following detailed description, the drawings, and the claims.

BRIEF DESCRIPTION OF THE DRAWINGS

Embodiments and features of the present disclosure will become more apparent by describing in detail embodiments thereof with reference to the attached drawings, in which.

DETAILED DESCRIPTION

Embodiments of the present disclosure will hereinafter be described with reference to the accompanying drawings.

Figure 1:
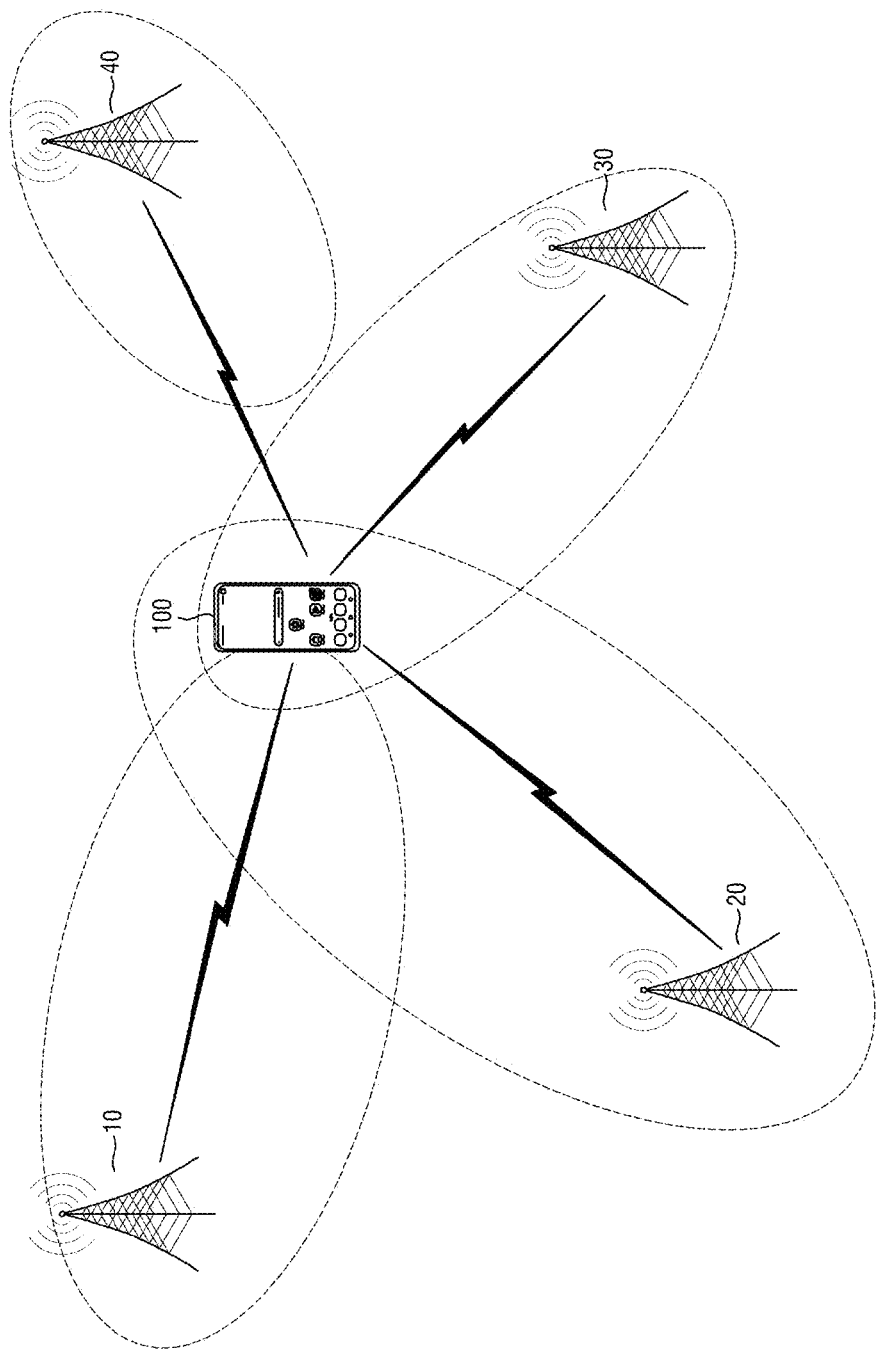
FIG. 1 illustrates a wireless communication system according to some embodiments of the present disclosure.
Figure 2:
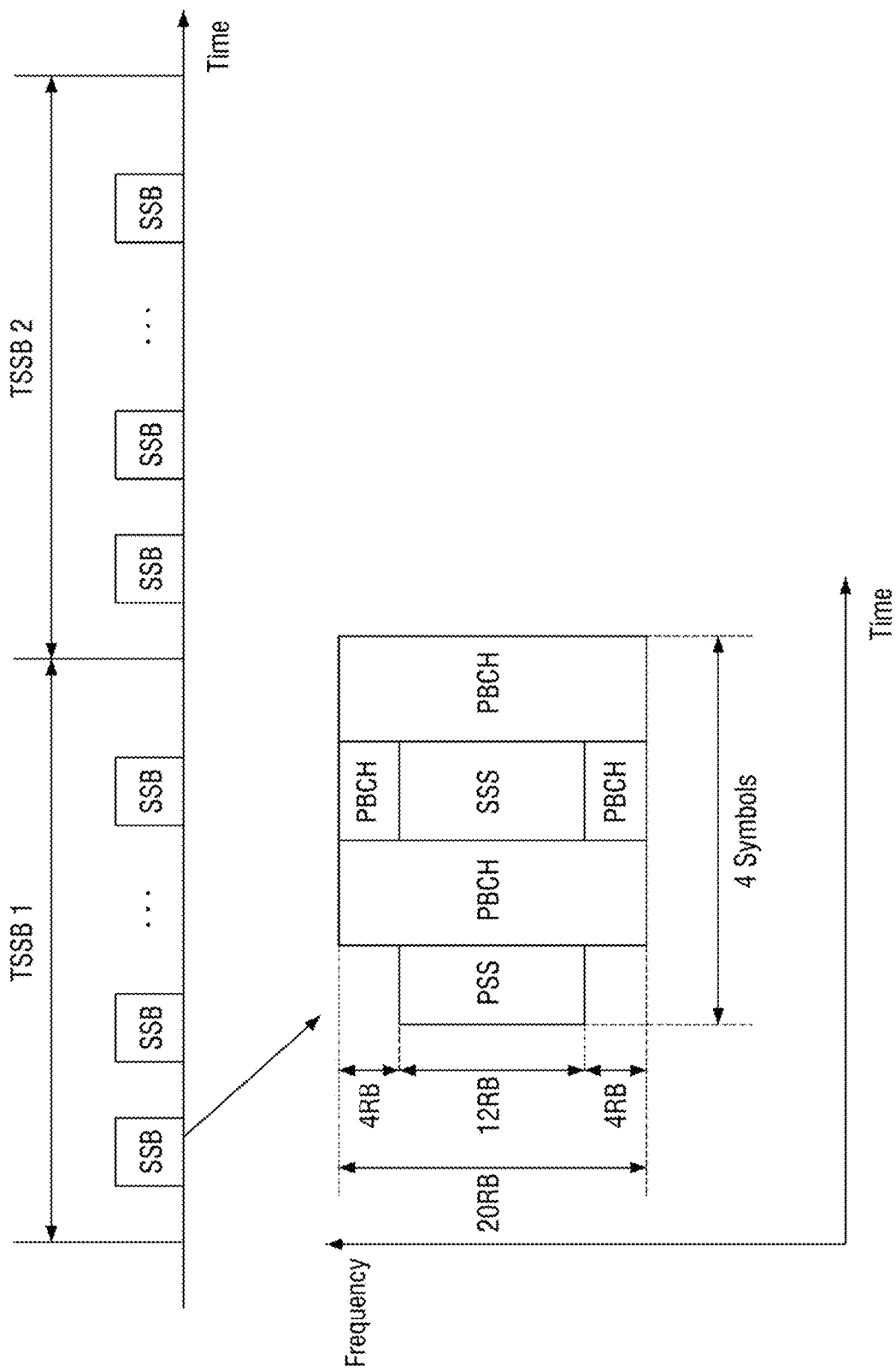
FIG. 2 illustrates synchronization signals provided to a communication device from each cell of FIG. 1.

FIG. 1 illustrates a wireless communication system according to some embodiments of the present disclosure. FIG. 2 illustrates synchronization signals provided to a communication device from each cell of FIG. 1.

Referring to FIG. 1, the wireless communication system may include a plurality of cells 10, 20, 30, and/or 40, and/or a communication device 100. FIG. 1 illustrates that the wireless communication system includes four cells, but some example embodiments are not limited thereto. That is, the number of cells included in the wireless communication system may vary.

The communication device 100 may access the wireless communication system by transmitting signals to, or receiving signals from, the cells 10, 20, 30, and/or 40. The wireless communication system that the communication device 100 accesses may be a wireless communication system using a cellular network such as, for example, a Fifth Generation (5G) communication system, a Long Term Evolution (LTE) communication device, an LTE-Advanced (LTE-A) communication system, a Code Division Multiple Access (CDMA) communication system, and/or a Global System for Mobile Communications (GSM) communication system. In some embodiments, the wireless communication system may be a Wireless Local Area Network (WLAN) communication system and/or another wireless communication system.

The wireless communication system will hereinafter be described as being a 5G communication system, but some example embodiments are not limited thereto.

The wireless communication network of the wireless communication system may support communication between multiple wireless communication devices, including the communication device 100, by sharing network resources that are available. For example, in a wireless communication network, information may be transmitted in various multiple access manners such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, OFDM-CDMA, and/or the like.

The cells 10, 20, 30, and/or 40 may be fixed stations that communicate with the communication device 100 and/or with other cells. The cells 10, 20, 30, and/or 40 may exchange data and/or control information by communicating with the communication device 100 and/or other cells.

For example, each of the cells 10, 20, 30, and/or 40 may also be referred to as a base station, a Node B, an Evolved Node B (eNB), a Next-Generation Node B (gNB), a sector, a site, a base transceiver system (BTS), an access point (AP), a relay node, a remote radio head (RRH), a radio unit (RU), and/or a small cell. The term "cell" or "base station", as used herein, may denote (e.g., correspond to) part of an area and/or function covered by a base station controller (BSC) in CDMA, a NodeB in WCDMA, an eNB or a sector (site) in LTE, and/or the like, and/or may encompass various coverage areas, such as a megacell, a macrocell, a microcell, a picocell, a femtocell, a small-cell communication range of a relay node, an RRU, an RU, and/or the like.

The communication device 100 may be, for example, user equipment (UE). The communication device 100 may refer to a device that is either fixed or mobile and may transmit and/or receive data and/or control information to and/or from the cells 10, 20, 30, and/or 40. For example, the communication device 100 may also be referred to as a mobile station (MS), a mobile terminal (MT), a user terminal (UT), a subscribe station (SS), a wireless device, a handheld device, and/or the like.

Referring to FIG. 1, the cells 10, 20, 30, and/or 40 may be connected to the communication device 10 via wireless channels and may thus provide various communication services. The cells 10, 20, 30, and/or 40 may service user traffic via shared channels and/or may set up a communication schedule by gathering state information of the communication device 100, such as buffer state information, available power transmission state information, and/or channel state information.

In some embodiments, the wireless communication system may support beamforming using Orthogonal Frequency Division Multiplexing (OFDM). Also, the wireless communication system may support Adaptive Modulation & Coding (AMC), which may be used to determine the modulation scheme and/or the channel coding rate of the communication device 100 in accordance with channel state.

In some embodiments, the wireless communication system may transmit and/or receive signals using a wide band of frequencies of 6 GHz or higher. For example, the wireless communication system may increase a data transmission rate using a millimeter wave band such as a 28 GHz band and/or a 60 GHz band.

The millimeter wave band has (e.g., experiences) a relatively large signal attenuation per distance, and thus, to secure coverage, the wireless communication system may support transmission and/or reception based on directional beams generated with multiple antennas. The wireless communication system may perform beam sweeping for directional beam-based transmission and/or reception.

Beam sweeping is a process of determining transmission and/or reception beams that are synchronized with each other in terms of direction, by allowing the communication device 100 and the cells 10, 20, 30, and/or 40 to sequentially or randomly sweep directional beams with a predetermined or determined beam pattern. The beam patterns of the transmission and/or reception beams may be determined as a transmission/reception beam pattern pair. The term "beam pattern", as used herein, may refer to the shape of a beam determined based on the width and the direction of the beam.

The communication device 100 will hereinafter be described as, for example, searching for a cell and measuring the strength of signals from the cells 10, 20, 30, and/or 40, and the cells 10, 20, 30, and/or 40 will hereinafter be described as, for example, transmitting synchronization signals including synchronization signal blocks (SSBs) for a cell search and/or signal strength measurement to the communication device 100 via multiple transmission beams having different beam patterns.

For example, the cells 10, 20, 30, and/or 40 may transmit synchronization signals including SSBs to the communication device 100 via multiple transmission beams.

Referring to FIGS. 1 and 2, the cells 10, 20, 30, and/or 40 may transmit synchronization signals, each including one of a plurality of SSBs, to the communication device 100 via a plurality of transmission beams.

For example, the cells 10, 20, 30, and/or 40 may transmit a synchronization signal including one of the plurality of SSBs to the communication device 100 via a first transmission beam and may transmit a synchronization signal including another one of the plurality of SSBs to the communication device 100 via a second transmission beam. In this manner, the cells 10, 20, 30, and/or 40 may transmit the plurality of SSBs to the communication device 100 via a plurality of transmission beams, and the communication device 100 may search for the cells 10, 20, 30, and/or 40 using the plurality of SSBs and may measure the strength of signals from the cells 10, 20, 30, and/or 40.

Referring to FIGS. 1 and 2, each SSB may include a primary synchronization signal (PSS), a secondary synchronization signal (SSS), and/or physical broadcast channels (PBCH).

In some embodiments, each SSB may include four symbols, and the PSS, the SSS, and the PBCHs may be disposed at locations corresponding to predetermined or determined resource blocks (RBs). Each RB may consist of twelve consecutive subcarriers. For example, the PSS, which may correspond to the first of the four symbols, may be transmitted to the communication device 100 via 127 subcarriers. According to some example embodiments, as depicted in FIG. 2, the SSS may be between PBCHs in one of the symbols of the SSB (may also be referred to herein as "PBCH/SSS/PBCH data").

In some embodiments, the cells 10, 20, 30, and/or 40 may transmit a maximum or upper limit of L SSBs (where L is a natural number) to the communication device 100 in an SSB burst set period.

Here, the SSB burst set period may be set to one of 5 ms, 10 ms, 20 ms, 40 ms, 80 ms, and/or 160 ms. In some embodiments, in a case where the communication device 100 initially accesses the cells 10, 20, 30, and/or 40, the SSB burst set period may be 20 ms, but some example embodiments are not limited thereto.

The maximum number (e.g., upper limit number) of SSBs transmitted by the cells 10, 20, 30, and/or 40 in the SSB burst set period, e.g., L, may vary depending on a radio frequency (RF) center frequency of signals received by the communication device 100.

For example, if the RF center frequency is 3 GHz or lower, the cells 10, 20, 30, and/or 40 may transmit a maximum (e.g., upper limit) of four SSBs in the SSB burst set period; if the RF center frequency ranges from 3 GHz to 6 GHz, the cells 10, 20, 30, and/or 40 may transmit a maximum (e.g., upper limit) of eight SSBs in the SSB burst set period; and if the RF center frequency falls within the millimeter wave band of 6 GHz or higher, the cells 10, 20, 30, and/or 40 may transmit a maximum (e.g., upper limit) of 64 SSBs in the SSB burst set period.

As illustrated in FIG. 2, first and second SSB burst set periods TSSB1 and TSSB2 may appear consecutively, and in each of the first and second SSB burst set periods TSSB1 and TSSB2, the cells 10, 20, 30, and/or 40 may transmit a maximum (e.g., upper limit) of L SSBs in accordance with the RF center frequency.

Figure 3:
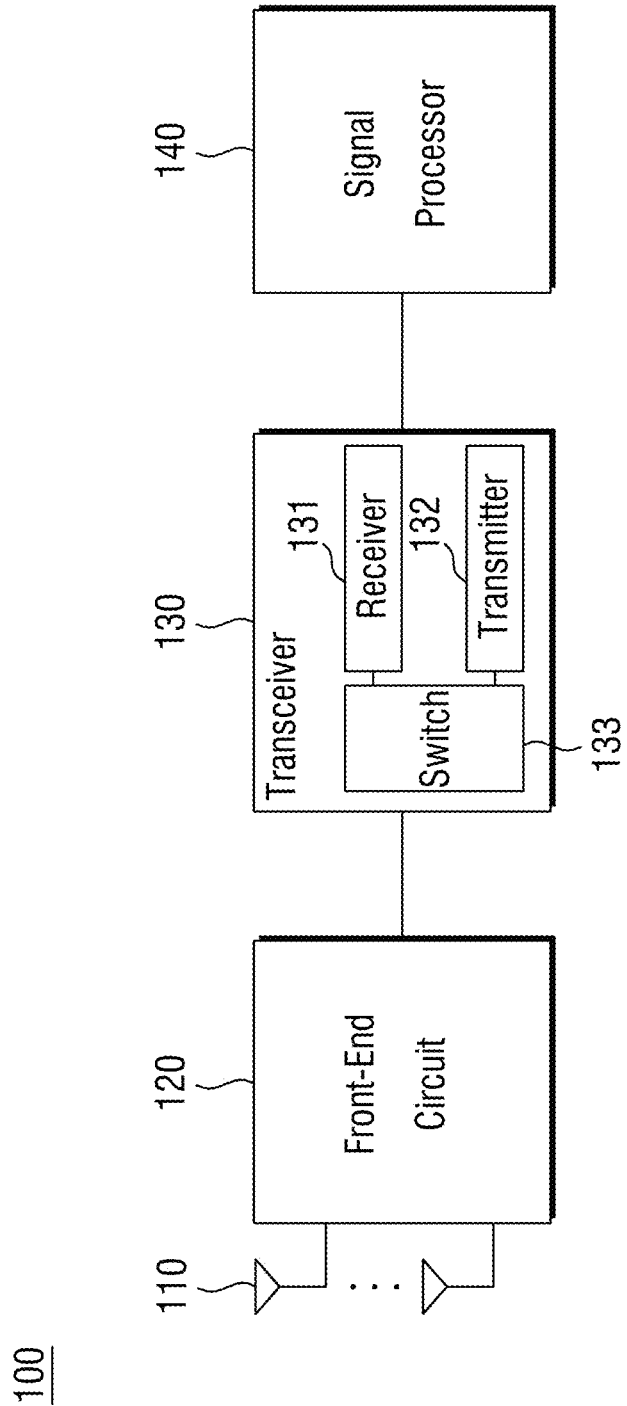
FIG. 3 is a block diagram of a communication device of FIG. 1.

FIG. 3 is a block diagram of the communication device of FIG. 1.

Referring to FIG. 3, the communication device 100 may include a plurality of antennas 110, a front-end circuit 120, a transceiver 130, and/or a signal processor 140. According to some example embodiments, operations described herein as being performed by the communication device 100, the front-end circuit 120, the transceiver 130, the signal processor 140, and/or any or all of the cells 10, 20, 30, and/or 40, may be performed by processing circuitry. The term 'processing circuitry,' as used in the present disclosure, may refer to, for example, hardware including logic circuits; a hardware/software combination such as at least one processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The antennas 110 may be connected to the front-end circuit 120. The antennas 110 may transmit and/or provide signals provided by (e.g., received from) the front-end circuit 120 to another communication device (or cell), and/or may provide signals received from another communication device to the front-end circuit 120.

In some embodiments, the communication device 100 may support a phased array communication, Multiple-Input and Multiple-Output (MIMO) communication, and/or the like using the antennas 110.

The front-end circuit 120 may include an antenna tuner (not illustrated), and the antenna tuner may be connected to the antennas 110 and may control the impedances of the antennas 110.

The transceiver 130 may include a receiver 131, a transmitter 132, and/or a switch 133. The receiver 131 may generate a baseband reception signal by processing an RF reception signal received from the switch 133 (e.g., from the front-end circuit 120 via the switch 133). For example, the receiver 131 may include a filter, a mixer, a low-noise amplifier, and/or the like. The receiver 131 may generate a baseband synchronization signal by processing an RF synchronization signal (e.g., an RF synchronization signal included in the RF reception signal), and the baseband synchronization signal may be provided to the signal processor 140.

The transmitter 132 may generate an RF transmission signal by processing a baseband transmission signal received from the signal processor 140. For example, the transmitter 132 may include a filter, a mixer, a power amplifier, and/or the like. According to some example embodiments, the transmitter 132 may send the RF transmission signal to the front-end circuit 120 via the switch 133. According to some example embodiments, the switch 133 may be configured to toggle for enabling a transmitting mode and/or a receiving mode. According to some example embodiments, operations described herein as being performed by the receiver 131 and/or the transmitter 132 may be performed by processing circuitry.

The signal processor 140 may perform a cell identifier (ID) search, SSB index detection, and/or synchronization signal-reference signal received power (SS-RSRP) estimation based on the synchronization signal provided by the receiver 131. The signal processor 140 will hereinafter be described with reference to FIGS. 4-5.

Figure 4:
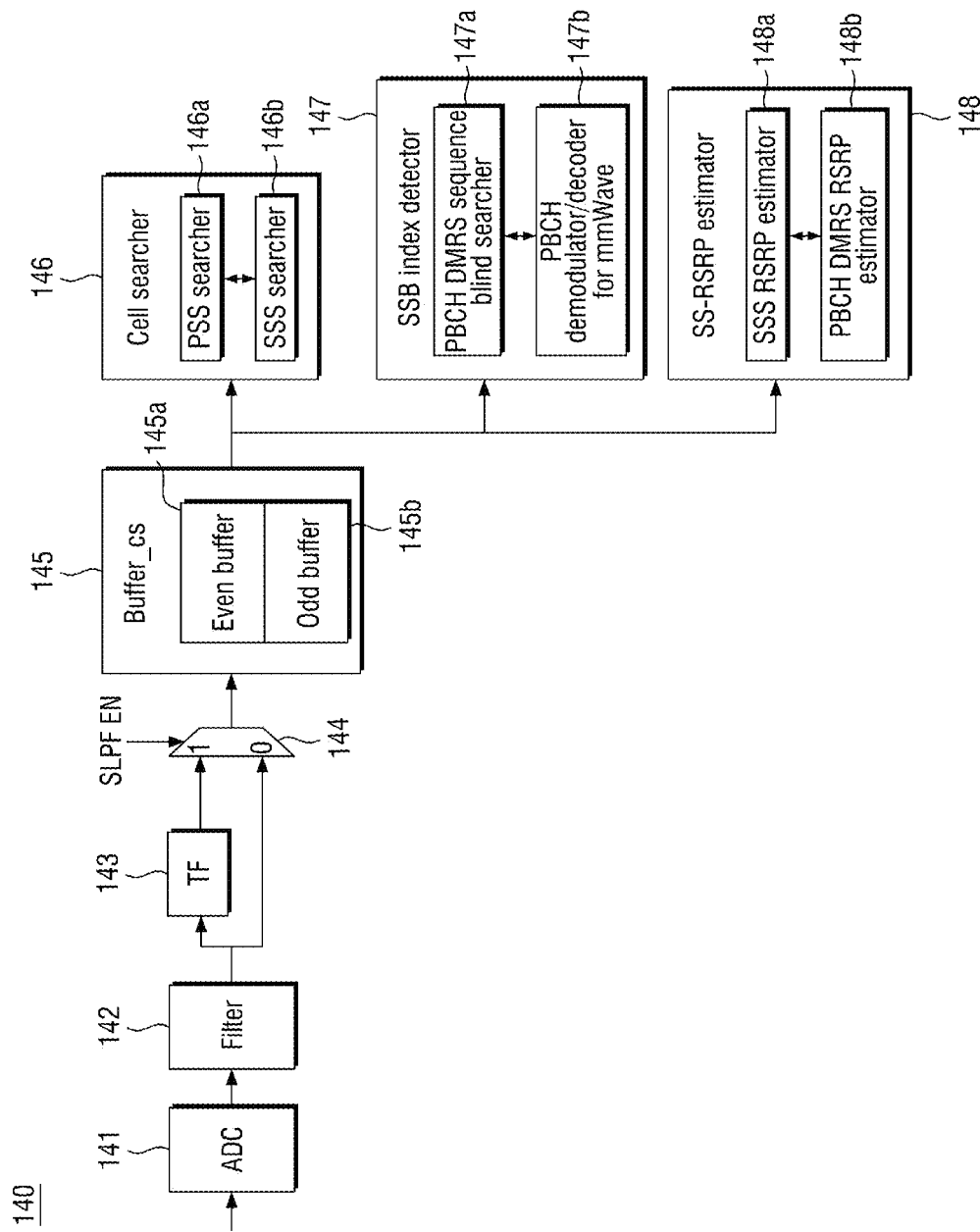
FIG. 4 is a detailed block diagram of a signal processor of FIG. 3.

FIG. 4 is a detailed block diagram of the signal processor of FIG. 3.

Referring to FIG. 4, the signal processor 140 may include an analog-to-digital converter (ADC) 141, a filter 142, a target filter 143 (depicted as "TF"), a multiplexer 144, a first buffering device 145 (depicted as "buffer_cs"), a cell searcher 146, an index detector 147 (depicted as "SSB index detector"), and/or an SS-RSRP estimator 148. According to some example embodiments, operations described herein as being performed by the ADC 141, the filter 142, the target filter 143, the multiplexer 144, the cell searcher 146, the index detector 147, and/or the SS-RSRP estimator 148 may be performed by processing circuitry.

For example, each of the elements of the signal processor 140, illustrated in FIG. 4 (e.g., the ADC 141, the filter 142, the target filter 143, the multiplexer 144, the cell searcher 146, the index detector 147, and/or the SS-RSRP estimator 148), may be implemented as a hardware block designed through logic synthesis, as a processing unit including at least one processor and a software block that is executed by the processor, and/or as the combination of the hardware block and the processing unit.

The ADC 141 may convert a synchronization signal provided to the signal processor 140 into a digital signal. The filter 142 may perform a predetermined or determined filtering operation on the digital signal input thereto.

The target filter 143 may pass therethrough only particular signals of the synchronization signal. For example, the target filter 143 may be designed to pass therethrough a PSS and an SSS of an SSB of the synchronization signal that correspond to predetermined or determined RBs and not to pass through PBCHs of the SSB that correspond to other RBs.

The multiplexer 144 may provide one of the output of the filter 142 and/or the output of the target filter 143 to the first buffering device 145 under the control of a control signal SLPF EN.

Specifically, in a case where a first control signal is provided to the multiplexer 144, e.g., SLPF EN=1, the multiplexer 144 may provide the output of the target filter 143 to the first buffering device 145. Accordingly, the PSS and SSS of each SSB may be stored as a whole (e.g., in their entireties) in first and second buffers 145a and 145b, but due to the target filter 143, only some of the PBCHs of each SSB (e.g., only PBCHs corresponding to the RBs where the PSS and SSS of each SSB are located) may be stored in the first and second buffers 145a and 145b.

On the contrary, in a case where a second control signal is provided to the multiplexer 144, e.g., SLPF EN=0, the multiplexer 144 may provide the output of the filter 142 to the first buffering device 145. Accordingly, not only the PSS and SSS of each SSB, but also all the PBCHs of each SSB, may be stored as a whole (e.g., in their entireties) in the first and second buffers 145a and 145b.

In a case where only PSS and SSS information is to be used for signal processing, the signal processor 140 may buffer only the PSS and SSS of each SSB by using the target filter 143 and may thus improve the efficiency of signal processing.

Figure 7:
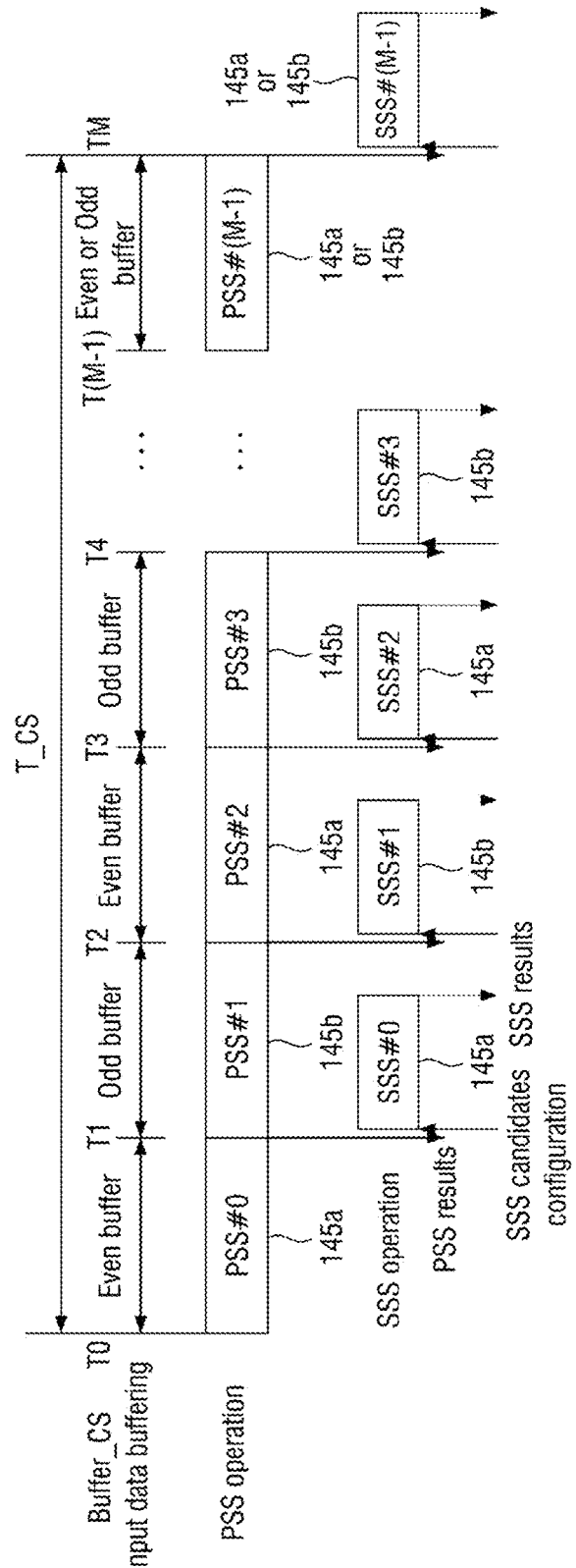

The first buffering device 145 may store the synchronization signal alternately in the first and second buffers 145a and 145b in a cell search period T_CS of FIG. 7.

Specifically, the first buffering device 145 may store the synchronization signal in the first buffer 145a as a first signal sample in a first search period which is part of the cell search period T_CS and ranges from T0 to T1 of FIG. 7, may store the synchronization signal in the second buffer 145b as a second signal sample in a second search period which is another part of the cell search period T_CS and ranges from T1 to T2 of FIG. 7, may store the synchronization signal in the first buffer 145a as a third signal sample in a third search period which is yet another part of the cell search period T_CS and ranges from T2 to T3 of FIG. 7, and may store the synchronization signal in the second buffer 145b as a fourth signal sample in a fourth search period which is yet still another part of the cell search period T_CS and ranges from T3 to T4 of FIG. 7. In this manner, the first buffering device 145 may store the synchronization signal alternately in the first and second buffers 145a and 145b in the cell search period T_CS, and methods for storing the synchronization signal alternately in the first and second buffers 145a and 145b will be described later in further detail. The first and second buffers 145a and 145b may be configured to be either physically separate or virtually separate through address management. According to some example embodiments, operations described herein as being performed by the first buffering device 145 (e.g., "storing") may be performed under the control of processing circuitry.

The cell searcher 146 may allow the communication device 100 to search for and find a cell through a cell search, to access the wireless communication system through the found cell, and to perform wireless communication.

The cell searcher 146 may include a PSS searcher 146a which searches for a PSS from signal samples stored in the first and second buffers 145a and 145b and/or an SSS searcher 146b which searches for an SSS from the signal samples stored in the first and second buffers 145a and 145b. According to some example embodiments, operations described herein as being performed by the PSS searcher 146a and/or the SSS searcher 146b may be performed by processing circuitry.

The PSS searcher 146a may search for candidate paths where the PSS of the SSB is believed to exist by correlating a reference signal and the signal samples stored in the first and second buffers 145a and 145b. In this manner, the PSS searcher 146a may detect the temporal location of the SSB and may thus search for and find a primary identification (PID) that has been transmitted from among three PIDs.

The SSS searcher 146b may perform an SSS correlation operation on the reference signal and the candidate paths found by the PSS searcher 146a for each cell ID. The SSS searcher 146b may use the result of the SSS correlation operation as SSS metrics and may determine that a valid SSS exists if a predetermined or determined condition is met. Here, the predetermined or determined condition refers to whether a given value is greater than the reference value, whether the ratio of the given value to an average value is greater than the reference value, and/or whether the ratio of the given value to a minimum value (or lower limit value) is greater than the reference value. In this manner, the SSS searcher 146b may find a secondary identification (SID) that has been transmitted from among 336 SSDs. Once the PID and the SSD (e.g., the SID) are found, a cell ID may be found, and a cell search may be performed.

The cell searcher 146 may output information regarding each SS-RSRP estimation candidate (e.g., each candidate SSB) on which to perform SS-RSRP estimation, based on the results of SSS searches. According to some example embodiments, the SS-RSRP estimation candidates are those candidate SSBs for which a valid SSS is determined to exist. This will be described later.

The index detector 147 may detect (e.g., determine) the index of each SS-RSRP estimation candidate based on the information output by the cell searcher 146. In some embodiments, the index detector 147 may detect the index of each candidate SSB, but some example embodiments are not limited thereto.

The index detector 147 may include a PBCH demodulation reference signal (DMRS) sequence blind searcher 147a (hereinafter, the DMRS sequence searcher 147a) and/or a PBCH decoder 147b (depicted as "PBCH demodulator/decoder for mmWave"). According to some example embodiments, operations described herein as being performed by the DMRS sequence searcher 147a and/or the PBCH decoder 147b may be performed by processing circuitry.

A DMRS is transmitted as one of eight sequences in accordance with a predetermined or determined SSB index. The DMRS sequence searcher 147a may determine which of the eight sequences the synchronization signal corresponds to. Specifically, the DMRS sequence searcher 147a may perform a search by correlating a total of eight PBCH DMRSs and a received PBCH DMRS to find a sequence that produces a maximum result (or a highest correlation result).

As described above, if the RF center frequency is 3 GHz or lower, a maximum (or upper limit) of four SSBs may be provided in the SSB burst set period, and if the RF center frequency ranges between 3 GHz and 6 GHz, a maximum (or upper limit) of eight SSBs may be provided in the SSB burst set period. That is, if the RF center frequency is 6 GHz or lower, the index of each SSB received in the SSB burst set period may be represented with three-bit information.

Thus, in a case where the RF center frequency is 6 GHz or lower, the DMRS sequence searcher 147a may find the index of each candidate SSB within the SSB burst set period once a determination is made as to which of the eight sequences the synchronization signal corresponds to (e.g., once the three-bit information is acquired).

However, in a case where the RF center frequency is in the millimeter band of 6 GHz or higher, a maximum (or upper limit) of 64 SSBs may be provided in the SSB burst set period. In this case, since six-bit information is used to represent the index of each SSB, the index of each candidate SSB may not be found with search results from the DMRS sequence searcher 147a, e.g., three-bit information. Thus, the PBCH decoder 147b may search for additional three-bit information by additionally performing decoding on PBCH signals.

In short, in a case where the RF center frequency is 6 GHz or lower, the index detector 147 may search for the index of each candidate SSB using the search results from the DMRS sequence searcher 147a, whereas in a case where the RF center frequency is 6 GHz or higher, the index detector 147 may search for the index of each candidate SSB by combining the search results from the DMRS sequence searcher 147a and search results from the PBCH decoder 147b.

The SS-RSRP estimator 148 may perform SS-RSRP estimation on each SS-RSRP estimation candidate to obtain (e.g., determine or estimate) a signal strength measurement. In some embodiments, the SS-RSRP estimator 148 may perform SS-RSRP estimation on each candidate SSB, but some example embodiments are not limited thereto.

The SS-RSRP estimator 148 may include an SSS RSRP estimator 148a and/or a PBCH DMRS RSRP estimator 148b. According to some example embodiments, operations described herein as being performed by the SSS RSRP estimator 148a and/or the PBCH DMRS RSRP estimator 148b may be performed by processing circuitry.

The SSS RSRP estimator 148a may perform SSS RSRP estimation on the SSS of a candidate SSB corresponding to the found index.

The PBCH DMRS RSRP estimator 148b may perform PBCH DMRS RSRP estimation on the PBCH DMRS of the candidate SSB corresponding to the found index. In some embodiments, the PBCH DMRS RSRP estimator 148b may perform PBCH DMRS RSRP estimation using the search results from the DMRS sequence searcher 147a.

The SS-RSRP estimator 148 may perform SS-RSRP estimation by combining search results from the SSS RSRP estimator 148a and search results from the PBCH DMRS RSRP estimator 148b.

An operating method of a communication device according to some embodiments of the present disclosure will hereinafter be described with reference to FIGS. 5 through 8.

Figure 5:
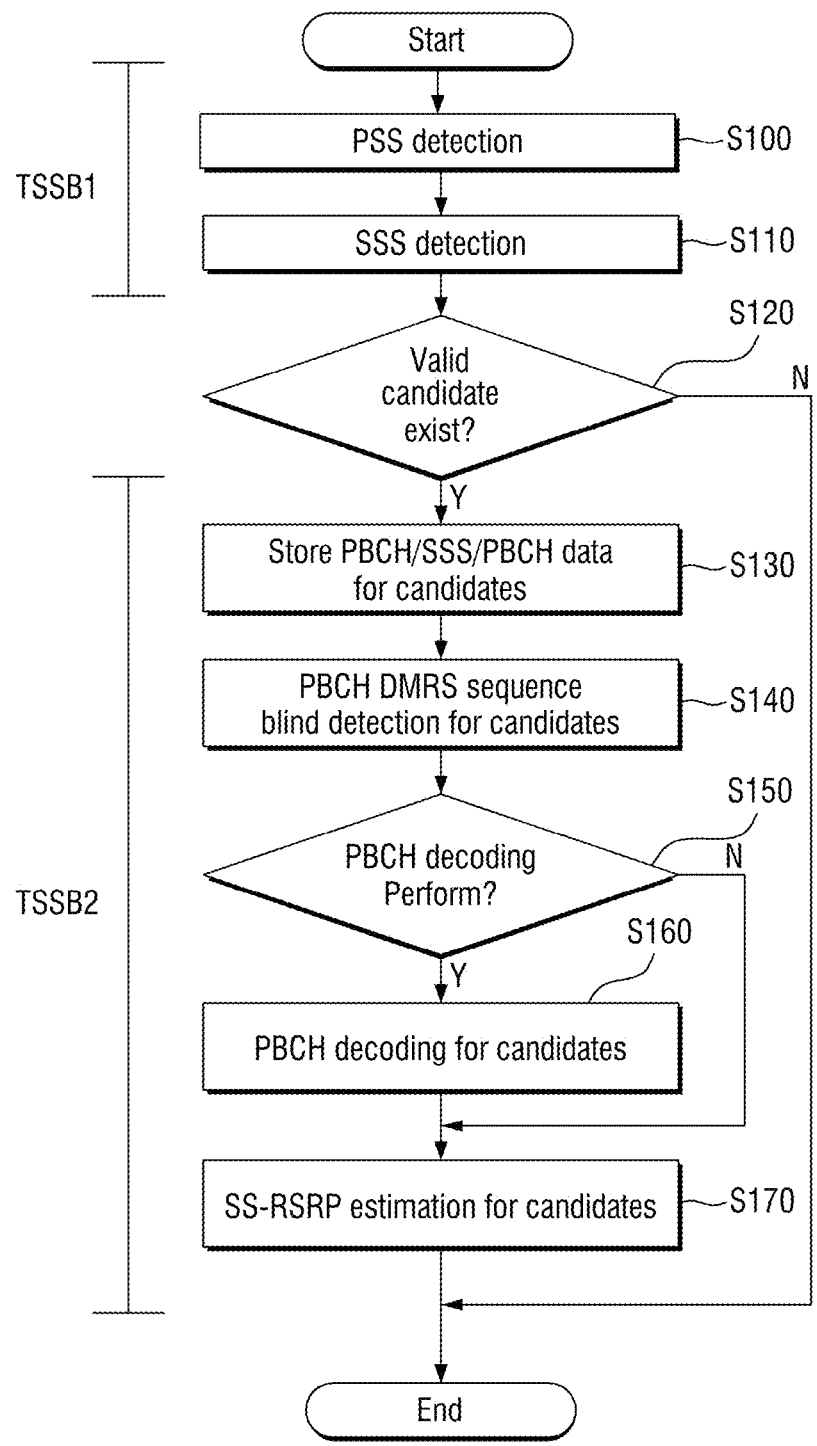
FIG. 5 is a flowchart illustrating an operating method of a communication device according to some embodiments of the present disclosure.
Figure 6:
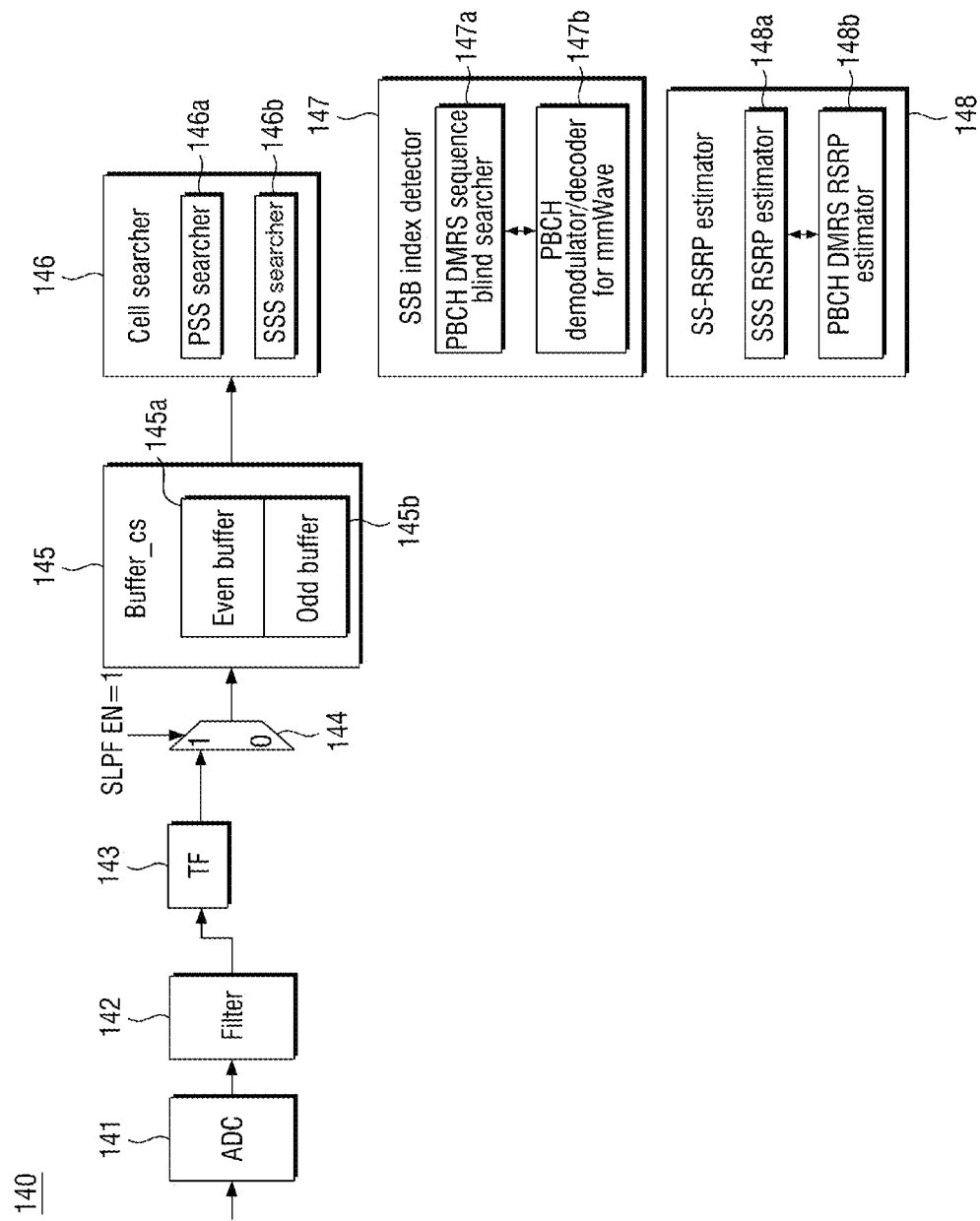
FIGS. 6 through 8 illustrate the operating method of FIG. 5.
Figure 8:
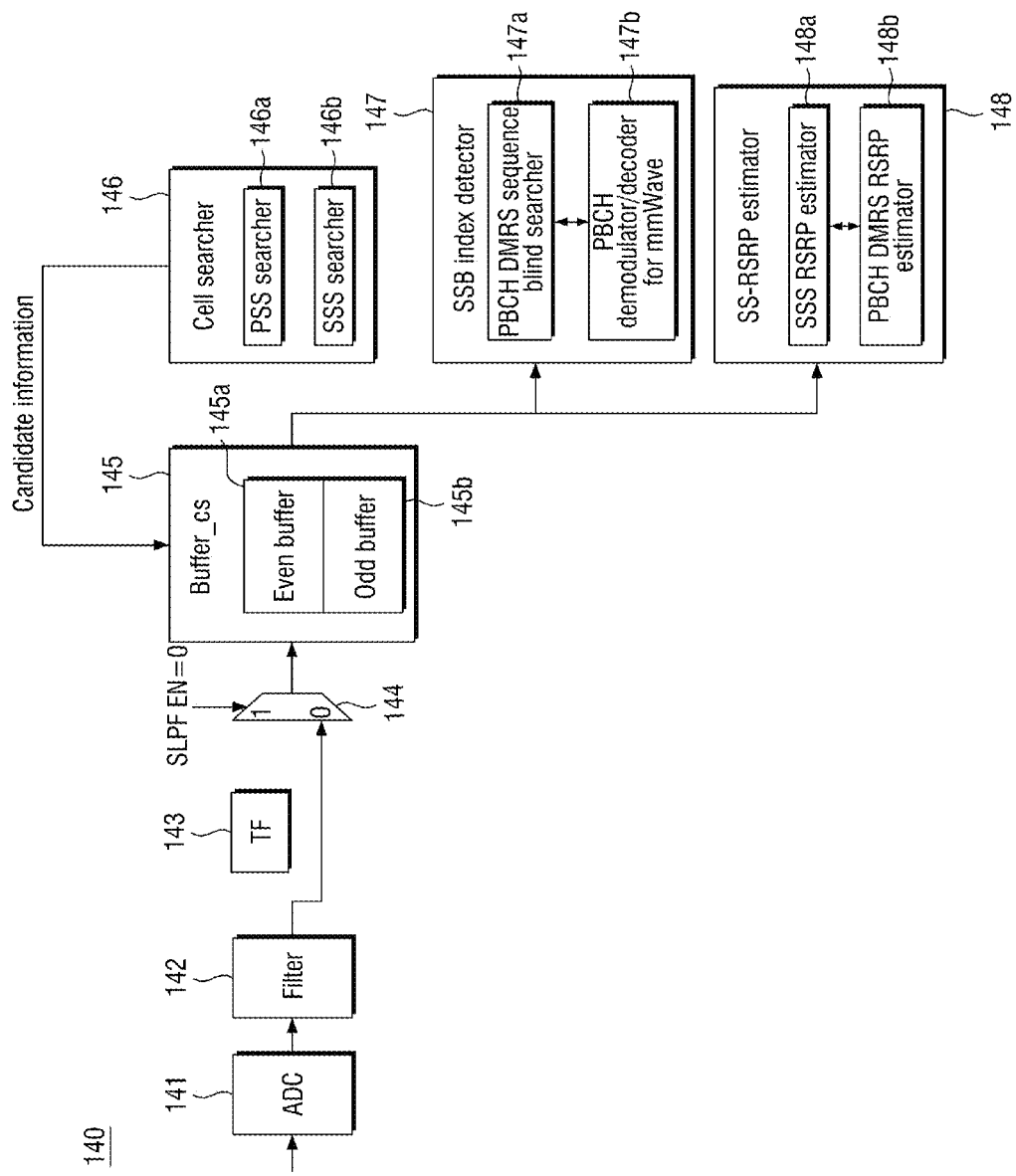

FIG. 5 is a flowchart illustrating an operating method of a communication device according to some embodiments of the present disclosure. FIGS. 6 through 8 illustrate the operating method of FIG. 5.

Referring to FIG. 5, a PSS search may be performed (S100). Thereafter, an SSS search may be performed (S110).

In some embodiments, PSS and SSS searches may be performed in the first SSB burst set period TSSB1.

Specifically, referring to FIG. 6, in the first SSB burst set period TSSB1, the first control signal may be provided to the multiplexer 144 of the signal processor 140 (e.g., SLPF EN=1). Accordingly, the multiplexer 144 may provide the output of the target filter 143 to the first buffering device 145.

In a case where the output of the target filter 143 is provided to the first buffering device 145, the PSS and SSS of each SSB are stored as a whole (e.g., in their entireties) in the first and second buffers 145a and 145b, but the PBCHs of each SSB may not be stored as a whole (e.g., in their entireties) in the first and second buffers 145a and 145b, due to the target filter 143, only PBCHs corresponding to the RBs where the PSS and SSS of each SSB are located may be stored in the first and second buffers 145a and 145b.

Since PSS and SSS searches are performed in the first SSB burst set period TSSB1, the types of signals stored in the first and second buffers 145a and 145b are limited in order to prevent excessive data from being stored, or reduce the amount of data stored, and thus to improve the efficiency of signal processing.

Referring to FIG. 7, in the cell search period T_CS, PSS and SSS searches may be performed. Since PSS and SSS searches are also performed in the first SSB burst set period TSSB1, the cell search period T_CS may be similar to or the same as the first SSB burst set period TSSB1, but some example embodiments are not limited thereto. That is, the cell search period T_CS may vary.

Referring to FIGS. 6 and 7, during the first search period ranging from T0 to T1, the first buffer 145a may store a synchronization signal filtered by the target filter 143 as a first signal sample (or a zeroth sample). The PSS searcher 146a may perform a PSS search on the first signal sample (or the zeroth sample). The result of the PSS search performed on the first signal sample (or the zeroth sample) may be provided to the SSS searcher 146b.

Thereafter, in the second search period ranging from T1 to T2, the second buffer 145b may store the synchronization signal filtered by the target filter 143 as a second signal sample (or a first sample). The PSS searcher 146a may perform a PSS search on the second signal sample (or the first sample).

The SSS searcher 146b may perform an SSS search on the first signal sample (or the zeroth sample) based on the result of the PSS search performed on the second signal sample (or the first sample). The result of the PSS search performed on the second signal sample (or the first sample) may be provided to the SSS searcher 146b.

In some embodiments, the length of the first search period may be the same as or similar to the length of the second search period, and the length of other search periods may be the same as or similar to the length of the first and second search periods. However, some example embodiments are not limited to this. That is, the length of each search period may vary.

Thereafter, in the third search period ranging from T2 to T3, the first buffer 145a may store the synchronization signal filtered by the target filter 143 as a third signal sample (or a second sample). The PSS searcher 146a may perform a PSS search on the third signal sample (or the second sample).

The SSS searcher 146b may perform an SSS search on the second signal sample (or the first sample) based on the result of the PSS search performed on the third signal sample (or the second sample). The result of the PSS search performed on the third signal sample (or the second sample) may be provided to the SSS searcher 146b.

Thereafter, in the fourth search period ranging from T3 to T4, the first buffer 145a may store the synchronization signal filtered by the target filter 143 as a fourth signal sample (or a third sample). The PSS searcher 146a may perform a PSS search on the fourth signal sample (or the third sample).

The SSS searcher 146b may perform an SSS search on the third signal sample (or the second sample) based on the result of the PSS search performed on the fourth signal sample (or the third sample). The result of the PSS search performed on fourth signal sample (or the third sample) may be provided to the SSS searcher 146b.

In this manner, PSS and SSS searches may be performed on a synchronization signal, including an SSB provided in the first SSS burst set period TSSB1, for each of M search periods (where M is a natural number) by alternately using the first and second buffers 145a and 145b.

Referring again to FIG. 5, a determination may be made as to whether there exists a valid candidate e.g., a valid SS-RSRP estimation candidate) as a result of the SSS search performed in S110 (S120).

If a determination is made that there exists a valid candidate SSB, the index of each candidate SSB (e.g., each valid candidate SSB) may be detected, and the SS-RSRP of each candidate SSB may be estimated to measure the signal strength of each candidate SSB. Accordingly, S130, S140, S150, S160, and/or S170 may be performed.

However, if a determination is made that there does not exist any valid candidate SSB, the operating method may end because perform SS-RSRP estimation is not performed.

Processes that may be performed when there exists a valid candidate SSB will hereinafter be described.

Referring to FIG. 5, in the second SSB burst set period TSSB2, which follows the first SSB burst set period TSSB1, the SS-RSRP of each candidate SSB may be estimated. According to some example embodiments, the second SSB burst set period TSSB2 may be of similar duration or the same duration as the first SSB burst set period TSSB1. According to some example embodiments, the second SSB burst set period TSSB2 may be similar to or the same as a second cell search period T_CS.

To this end, data for performing SS-RSRP estimation on each candidate SSB may be stored (S130).

Referring to FIG. 8, in the second SSB burst set period TSSB2, the second control signal may be provided to the multiplexer 144 of the signal processor 140 (e.g., SLPF EN=1). Accordingly, the multiplexer 144 may provide a synchronization signal that has not been passed through the target filter 143 to the first buffering device 145.

In a case where the synchronization signal that has not been passed through the target filter 143 is provided to the first buffering device 145, not only the PSS and SSS of each SSB, but also all the PBCHs of each SSB, may be stored as a whole (e.g., in their entireties) in the first and second buffers 145a and 145b.

Meanwhile, the first buffering device 145 may receive information regarding each candidate SSB based on the results of the SSS searches performed in the first SSB burst set period TSSB1. By using the received information, the first buffering device 145 may store PBCH/SSS/PBCH data of each candidate SSB in the first and second buffers 145a and 145b.

Each candidate SSB is illustrated as being provided from the cell searcher 146 to the first buffering device 145, but some example embodiments are not limited thereto. That is, the provision of each candidate SSB may vary as long as the PBCH/SSS/PBCH data of each candidate SSB is stored in the first and second buffers 145a and 145b (e.g., based on available storage capacity of the first and second buffers 145a and 145b).

Referring again to FIG. 5, a PBCH DMRS sequence search may be performed on each candidate SSB to detect the index of each candidate SSB (S140).

Referring to FIG. 8, the DMRS sequence searcher 147a may perform a PBCH DMRS sequence search by correlating a total of eight PBCH DMRS sequence reference signals and a received PBCH DMRS sequence to find a sequence that produces a maximum result (e.g., a highest correlation result).

Referring again to FIG. 5, a determination may be made as to whether PBCH decoding should be performed (S150).

As described above, in a case where the RF center frequency is 6 GHz or lower, the index of each candidate SSB may be detected with only three-bit information, which may be the result of the search performed by the DMRS sequence searcher 147a. In this case, S160 may not be performed.

However, in a case where the RF center frequency is in the millimeter wave band of 6 GHz or higher, PBCH decoding may performed on each candidate SSB (S160). PBCH decoding may be performed by, for example, the PBCH decoder 147b of FIG. 8.

In this manner, the index of each candidate SSB may be detected.

Referring again to FIG. 5, SS-RSRP estimation may be performed on each candidate SSB (S170).

Referring to FIG. 8, for example, the SS-RSRP estimator 148 may perform SS-RSRP on each candidate SSB by performing SSS RSRP estimation on the SSS of each candidate SSB and PBCH DMRS RSRP estimation on the PBCH DMRS of each candidate SSB with the use of the SSS RSRP estimator 148a and the PBCH DMRS RSRP estimator 148b.

In short, according to some example embodiments, a synchronization signal may be divided into a plurality of signal samples using a plurality of memories (e.g., the first and second buffers 145a and 145b), and PSS and SSS searches may both be performed in the first SSB burst set period TSSB1.

Then, in the second SSB burst set period TSSB2, which follows the first SSB burst set period TSSB1, the detection of the index of each candidate SSB and SS-RSRP estimation may both be performed, according to some example embodiments.

In conventional communication devices, a PSS search, an SSS search, SSB index detection, and SS-RSRP estimation are all performed in each SSB burst set period. Accordingly, a minimum (e.g., lower limit) of four SSB burst set periods are used for SS-RSRP estimation in conventional communication devices, resulting in excessive processing delay in performing the SS-RSRP estimation.

However, according to some example embodiments, all operations for SS-RSRP estimation may be performed in parallel using a plurality of buffers (e.g., the first and second buffers 145a and 145b). Thus, by reducing and/or eliminating the excessive processing delay of the conventional communication devices, the speed of signal processing may be improved. As a result, the operating performance of a communication device may be improved.

SS-RSRP estimation may be performed through a series of processes to identify a camp-on condition during initial access, and/or to perform a handover and/or cell reselection through inter-frequency measurement. According to some example embodiments, the communication device 100 may use the SS-RSRP estimation calculated by the SS-RSRP estimator 148 to determine a cell (e.g., a base station) with which to perform communication, and/or transmission/reception beam pattern pair to be used to perform communication with the cell. As the amount of time that it takes to perform SS-RSRP estimation decreases, the amount of time that it takes to perform a handover or cell reselection likewise decreases, and as a result, the operating performance of a communication device or a communication system may be improved.

A signal processor according to some embodiments of the present disclosure will hereinafter be described with reference to FIG. 9, focusing mainly on the differences with the signal processor 140.

Figure 9:
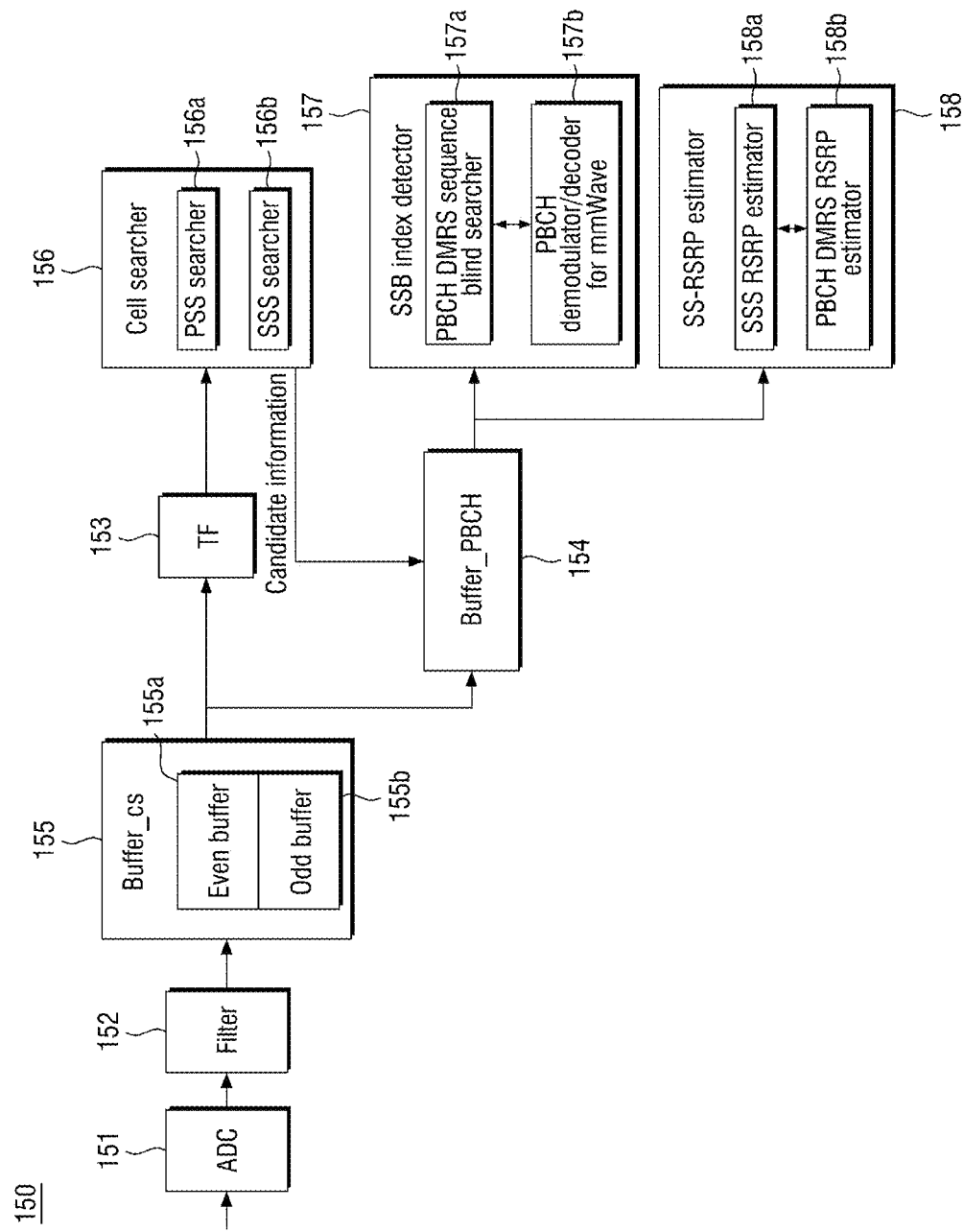
FIG. 9 is a detailed block diagram of a signal processor according to some embodiments of the present disclosure.

FIG. 9 is a detailed block diagram of a signal processor according to some embodiments of the present disclosure.

Referring to FIG. 9, a signal processor 150 may include an ADC 151, a filter 152, a target filter 153, a first buffering device 155, a second buffering device 154 (depicted as "Buffer_PBCH"), a cell searcher 156, an index detector 157, and/or an SS-RSRP estimator 158. According to some example embodiments, operations described herein as being performed by the ADC 151, the filter 152, the target filter 153, the cell searcher 156, the index detector 157, and/or the SS-RSRP estimator 158 may be performed by processing circuitry.

Each SSB may be stored as a whole (e.g., in its entirety) in first and second buffers 155a and 155b of the first buffering device 155 as a plurality of sample signals. When the sample signals stored in the first and second buffers 155a and 155b are provided to the cell searcher 156, the target filter 153 may allow only particular signals of each SSB to be transmitted to the cell searcher 156.

The second buffering device 154 may receive information regarding each candidate SSB from the cell searcher 156 and may store PBCH/SSS/PBCH data of each candidate SSB. Each candidate SSB is illustrated as being provided from the cell searcher 156 to the second buffering device 154, but some example embodiments are not limited thereto. That is, the provision of each candidate SSB may vary as long as the PBCH/SSS/PBCH data of each candidate SSB may be stored in the second buffering device 154. According to some example embodiments, operations described herein as being performed by the first buffering device 155 and/or the second buffering device 154 (e.g., "receiving" and/or "storing") may be performed under the control of processing circuitry.

The signal processor 150 is similar to the signal processor 140, and thus, a detailed description thereof (e.g., redundant description of corresponding features) will be omitted. For example, the cell searcher 156 may include a PSS searcher 156a that is the same as or similar to the PSS searcher 146a, and/or a SSS searcher 156b that is the same as or similar to the SSS searcher 146b. The index detector 157 may include a DMRS sequence searcher 157a that is the same as or similar to the DMRS sequence searcher 147a, and/or a PBCH decoder 157b that is the same as or similar to the PBCH decoder 147b. The SS-RSRP estimator 158 may include an SSS RSRP estimator 158a that is the same as or similar to the SSS RSRP estimator 148a, and/or a PBCH DMRS RSRP estimator 158b that is the same as or similar to the PBCH DMRS RSRP estimator 148b.

An operating method of a communication device according to some embodiments of the present disclosure will hereinafter be described with reference to FIGS. 10 and 11.

Figure 10:
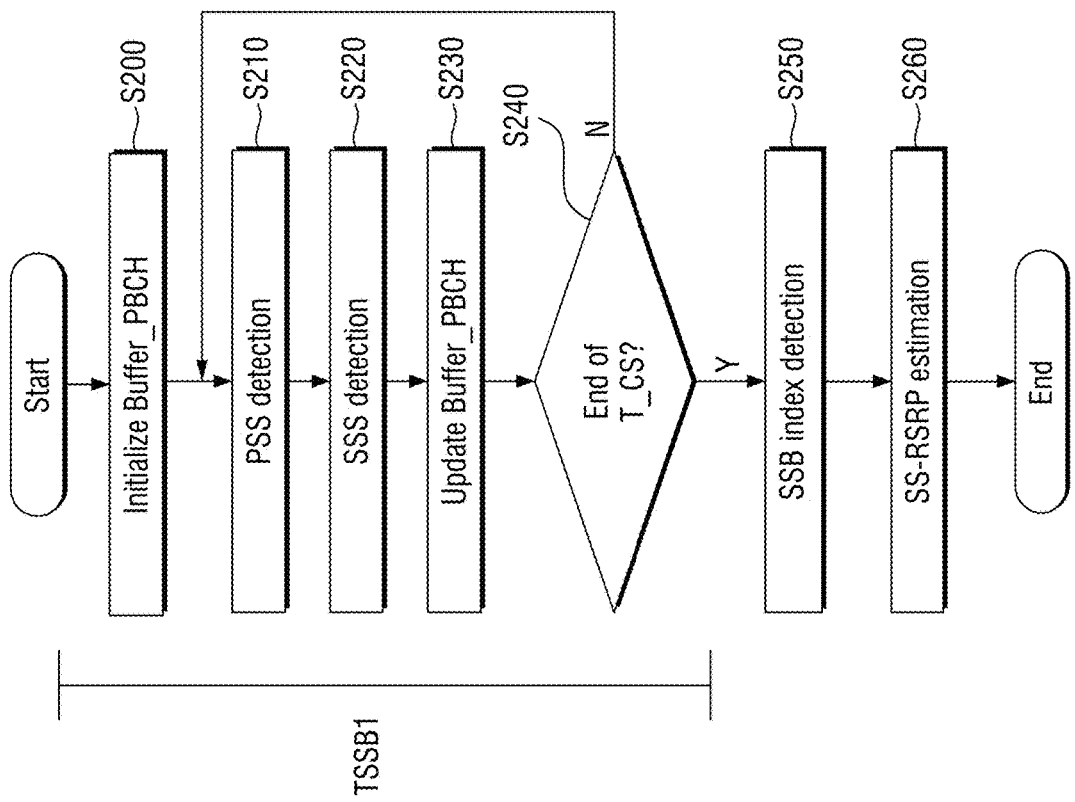
FIG. 10 is a flowchart illustrating an operating method of a communication device according to some embodiments of the present disclosure.

FIG. 10 is a flowchart illustrating an operating method of a communication device according to some embodiments of the present disclosure. FIG. 11 illustrates the operating method of FIG. 10.

The method of FIG. 10 differs from the method of FIG. 5 in that a PSS search (S210), an SSS search (S220), and the storing of data for SS-RSRP estimation (S230) may all be completed within a first SSB burst set period TSSB1. That is, in the method of FIG. 5, two SSB burst set periods may be used to perform SS-RSRP estimation on each candidate SSB, but in the method of FIG. 10, only one SSB burst set period may be used to perform SS-RSRP on each candidate SSB.

Specifically, referring to FIG. 10, the second buffering device 154 may be initialized (S200) (e.g., by deleting the data currently stored in the second buffering device 154 and/or making the entire capacity of the second buffering device 154 available for storage).

Figure 11:
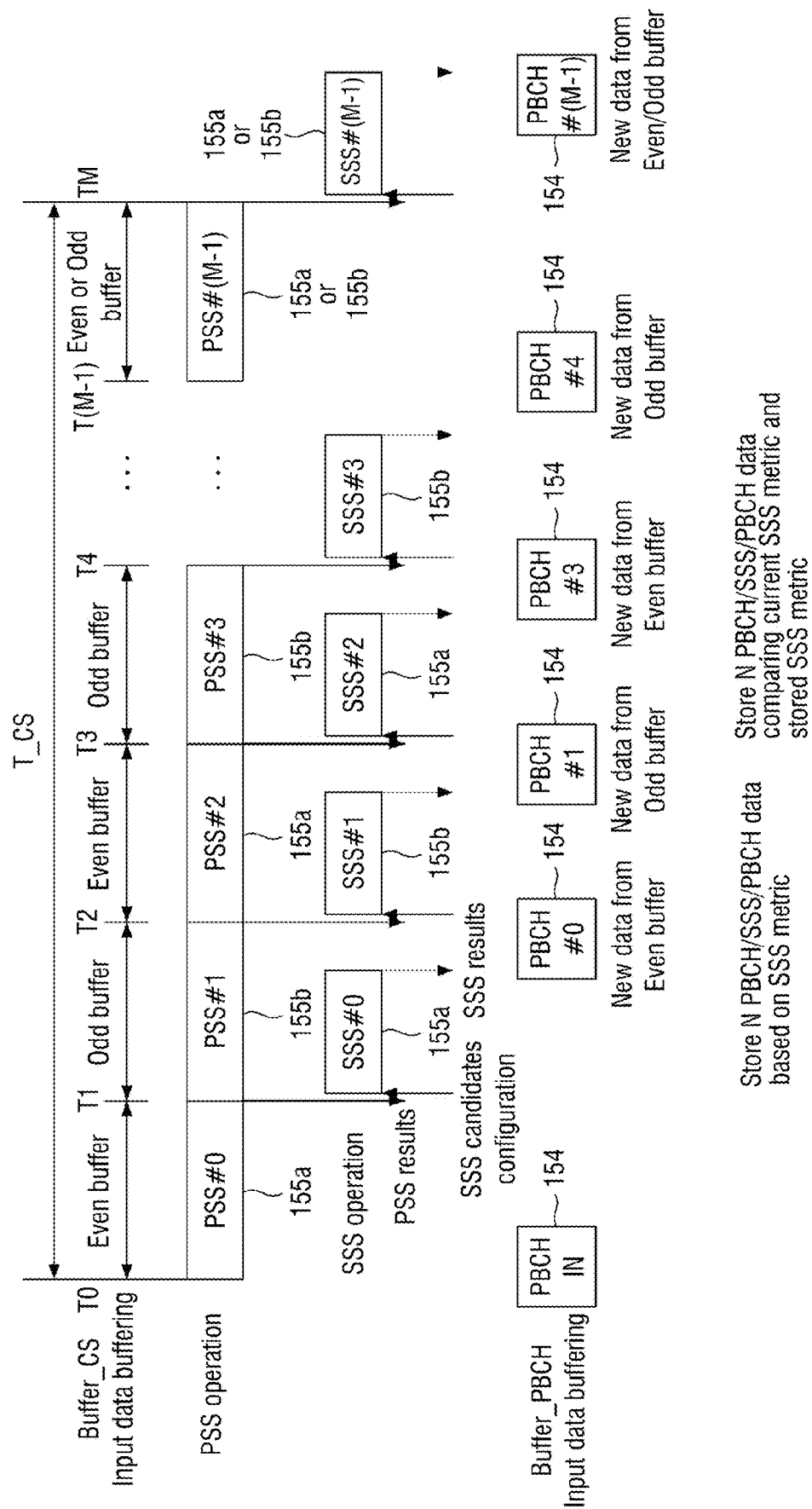
FIG. 11 illustrates the operating method of FIG. 10.

Referring to FIGS. 9 and 11, for example, an operation for subsequent signal processing may be performed on the second buffering device 154.

Thereafter, referring to FIG. 10, PSS and SSS searches may be performed (S210 and S220).

Referring to FIGS. 9 and 11, in a cell search period T_CS, PSS and SSS searches may be performed using the first and second buffers 155a and 155b of the first buffering device 155. Operations S210 and S220 may be similar to or the same as their respective counterparts of FIG. 5, and thus, detailed descriptions thereof will be omitted.

The cell search period T_CS may be similar to or the same as the first SSB burst set period TSSB1, but some example embodiments are not limited thereto.

Thereafter, referring to FIG. 10, the second buffering device 154 may be updated based on the result of the SSS search performed in S220 (S230). Operations S210, S220, and S230 may be repeated (S240) during the cell search period T_CS.

Referring to FIGS. 9 and 11, it is assumed that N pieces (e.g., segments) of PBCH/SSS/PBCH data may be stored in the second buffering device 154 (depicted in FIG. 11 as "PBCH"). Since there does not exist candidate SSB data in the second buffering device 154 at the stage of an initial SSS search, SSS metric values and PBCH/SSS/PBCH data of top N candidates (or candidate SSBs) in descending order of SSS metrics (e.g., the top N SSS correlation values in descending order) may be stored in the second buffering device 154. According to some example embodiments, the top N candidates may be stored in the second buffering device 154 in the second search period ranging from T1 to T2 (depicted as "PBCH #0) based on the SSS search performed by the SSS searcher 156b on the first signal sample (or the zeroth sample).

According to some example embodiments, only data regarding candidates that satisfy a predetermined or determined condition are stored. If the number of candidates that satisfy the predetermined or determined condition is less than N, PBCH/SSS/PBCH data of the candidates may be stored. However, if the number of candidates that satisfy the predetermined or determined condition exceeds than N, only the PBCH/SSS/PBCH data of the top N candidates in descending order of the SSS metric data may be stored.

Thereafter, in subsequent SSS searches that may be repeated in the cell search period T_CS, newly-obtained SSS metrics and existing SSS metrics stored in the second buffering device 154 may be compared and may then be arranged in descending order, and then, PBCH/SSS/PBCH data of top N candidates among the newly-obtained SSS metrics and the existing SSS metrics may be stored. According to some example embodiments, the top N candidates among the newly-obtained SSS metrics and the existing SSS metrics may be stored in the second buffering device 154 in the third search period ranging from T2 to T3 (depicted as "PBCH #1), based on the SSS search performed by the SSS searcher 156b on the second signal sample (or the first sample). Similar operations may be performed in subsequent periods (depicted as "PBCH #2," "PBCH #3," "PBCH #4," . . . "PBCH #(M−1)").

According to some example embodiments, candidates that satisfy a predetermined or determined condition may be searched for and found from the newly-obtained SSS metrics, and the found candidates may be compared with the existing SSS metrics. Then, if the number of found candidates is less than N, PBCH/SSS/PBCH data of all the found candidates may be stored, and if the number of found candidates exceeds N, only PBCH/SSS/PBCH data of top N candidates among the found candidates may be stored.

Thereafter (e.g., after the end of the cell search period T_CS is determined in operation S240), referring to FIG. 10, the index of each candidate SSB may be detected (S250), and SS-RSRP estimation may be performed on each candidate SSB (S260).

Specifically, once the update of the second buffering device 154 is completed during the cell search period T_CS, SSB index detection and SS-RSRP estimation may be performed on each candidate SSB in descending order of SSS metrics based on the PBCH/SSS/PBCH data and the SSS metrics of the candidate SSBs stored in the second buffering device 154.

Figure 12:
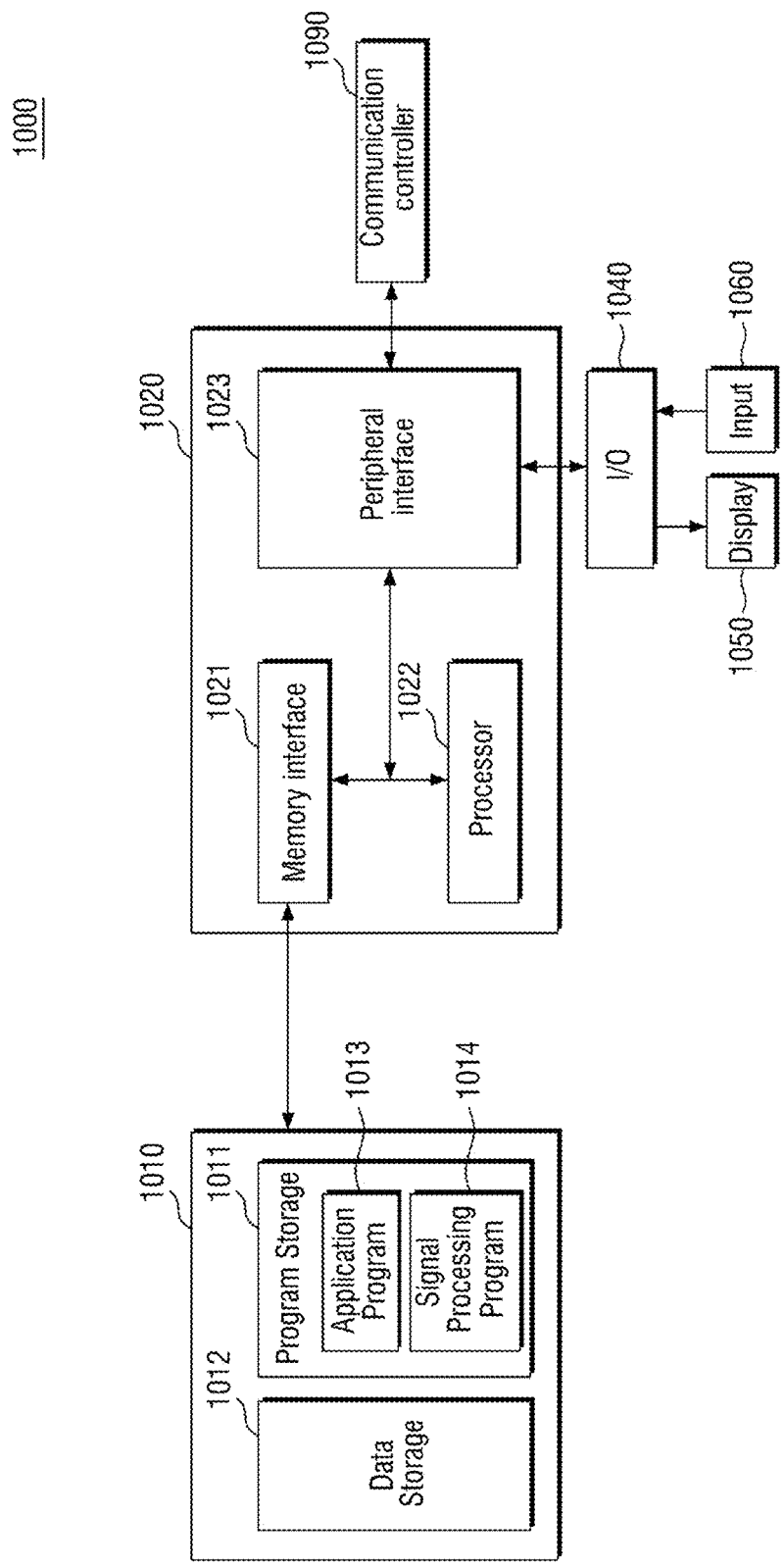
FIG. 12 is a block diagram of an electronic device according to some embodiments of the present disclosure.

FIG. 12 is a block diagram of an electronic device according to some embodiments of the present disclosure.

Referring to FIG. 12, an electronic device 1000 may include a memory 1010, a processor unit 1020, an input/output (I/O) controller 1040, a display 1050, an input device 1060, and/or a communication controller 1090. More than one memory 1010 may be provided.

The memory 1010 may include a program storage 1011 which may store programs for controlling the operation of the electronic device 1000 and/or a data storage 1012 which may store data generated in the process of executing any or all of the programs. The data storage 1012 may store data used for an application program 1013 and/or a signal processing program 1014.

The program storage 1011 may include (e.g., store) the application program 1013 and/or the signal processing program 1014. Here, the programs included in the program storage 1011 may be represented as instruction sets.

The application program 1013 may include an application that may operate in the electronic device 1000. That is, the application program 1013 may include application instructions that may be executed by processing circuitry (e.g., a processor 1022). The signal processing program 1014 may include codes for implementing the operating method of FIG. 5 and/or FIG. 10.

A peripheral interface 1023 may control the connection between an I/O peripheral device of a base station, the processing circuitry (e.g., the processor 1022), and/or a memory interface 1021. The processing circuitry may control the base station to provide a service by using at least one software program. The processing circuitry may execute at least one program stored in the memory 1010 and may thus provide a service corresponding to the executed program.

The I/O controller 1040 may provide an interface between an I/O device such as the display 1050, the input device 1060 and/or the peripheral interface 1023. The display 1050 may display state information, input characters, moving pictures, and/or still images. For example, the display 1050 may display information regarding an application program being driven by the processing circuitry.

The input device 1060 may provide input data generated in response to a selection made by the electronic device 1000 to the processor unit 1020 via the I/O controller 1040. The input device 1060 may include a keypad which includes at least one hardware button and/or a touch pad which may detect touch information. For example, the input device 1060 may provide touch information such as a touch, touch motion, and/or touch cancellation detected via the touch pad to the processing circuitry via the I/O controller 1040. The electronic device 1000 may include the communication controller 1090, which may perform a communication function for audio/data communication. According to some example embodiments, operations described herein as being performed by any or all of the electronic device 1000, the processor unit 1020 and/or the peripheral interface (e.g., "controlling") may be performed by the processing circuitry.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail above. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, or in some cases be performed in reverse order.

While embodiments are described above, it is not intended that these embodiments describe all possible forms of the inventive concepts of the present disclosure. Rather, the words used in the specification are words of description rather than limitation, and it is understood that various changes may be made without departing from the spirit and scope of the inventive concepts of the present disclosure. Additionally, the features of various implementing embodiments may be combined to form further embodiments of the present disclosure.

What is claimed is:

1. An operating method of a communication device, comprising:
    storing a first part of a synchronization signal received from a cell as a first signal sample in a first synchronization signal period;
    storing a second part of the synchronization signal as a second signal sample different from the first signal sample;
    performing a primary synchronization signal (PSS) search on the second signal sample contemporaneous with performing a secondary synchronization signal (SSS) search on the first signal sample;
    determining synchronization signal-reference signal received power (SS-RSRP) estimation candidates within the first synchronization signal period based on a result of the SSS search;
    determining a respective index for each of the SS-RSRP estimation candidates by decoding a physical broadcast channel (PBCH) included in the synchronization signal in response to determining the synchronization signal has a center frequency of 6 GHz or more; and
    performing an SS-RSRP estimation operation on each of the SS-RSRP estimation candidates corresponding to the respective index for each of the SS-RSRP estimation candidates, the SS-RSRP estimation operation being performed within a second synchronization signal period consecutive to the first synchronization signal period, and the SS-RSRP estimation operation including estimating an RSRP of a PBCH demodulation reference signal (DMRS).

2. The operating method of claim 1, wherein
    the first and second consecutive synchronization signal periods include first and second consecutive synchronization signal block (SSB) burst set periods; and
    the synchronization signal includes an SSB.

3. The operating method of claim 1, further comprising:
    performing a PSS search on the first signal sample, the performing a SSS search on the first signal sample being based on a result of the performing a PSS search on the first signal sample.

4. The operating method of claim 1, wherein
    the storing a first part of a synchronization signal as a first signal sample stores the first signal sample in a first buffer; and
    the storing a second part of a synchronization signal as a second signal sample stores the second signal sample in a second buffer different from the first buffer.

5. The operating method of claim 1, wherein
    the performing the SS-RSRP estimation operation comprises,
        storing data for the SS-RSRP estimation operation, and
        performing the SS-RSRP estimation operation on the SS-RSRP estimation candidates;
    the synchronization signal includes an SSB;
    the SS-RSRP estimation candidates include a candidate SSB; and
    the data for the SS-RSRP estimation operation includes SSB data and PBCH data that are included in the candidate SSB, the PBCH data including the PBCH DMRS.

6. The operating method of claim 5, wherein
    the storing the first signal sample is performed within the first synchronization signal period among the first and second consecutive synchronization signal periods; and
    the storing the data for the SS-RSRP estimation operation is performed within the second synchronization signal period among the first and second consecutive synchronization signal periods.

7. The operating method of claim 5, wherein the storing the first signal sample and the storing the data for the SS-RSRP estimation operation are both performed within the first synchronization signal period among the first and second consecutive synchronization signal periods.

8. The operating method of claim 1, further comprising:
    storing a second part of the synchronization signal as a second signal sample different from the first signal sample during the determining the SS-RSRP estimation candidates.

9. The operating method of claim 1, further comprising:
    receiving the synchronization signal from a cell within first and second synchronization signal block (SSB) burst set periods, wherein
        the first synchronization signal period is the first SSB burst set period,
        the second synchronization signal period is the second SSB burst set period,
        the receiving the synchronization signal includes filtering a subset of first PBCH data included in the synchronization signal received during the first SSB burst set period,
        the operating method further comprises storing second PBCH data of the SS-RSRP estimation candidates based on the determining the SS-RSRP estimation candidates to obtain stored second PBCH data, the second PBCH data being included in the synchronization signal received during the second SSB burst set period, and the second PBCH data including the PBCH DMRS, and
        the SS-RSRP estimation operation is performed based on the stored second PBCH data.

10. The operating method of claim 9, wherein
    the storing a first part of a synchronization signal as a first signal sample stores the first signal sample in a first buffer; and
    the storing a second part of a synchronization signal as a second signal sample stores the second signal sample in a second buffer different from the first buffer.

11. An operating method of a communication device, comprising:
    receiving a synchronization signal from a cell within first and second synchronization signal block (SSB) burst set periods;
    storing the synchronization signal as a first signal sample in a first cell search period, the first cell search period being shorter than each of the first and second SSB burst set periods;
    storing the synchronization signal as a second signal sample in a second cell search period different from the first cell search period, the second cell search period being shorter than the each of the first and second SSB burst set periods;
    determining a synchronization signal-reference signal received power (SS-RSRP) estimation candidate based on the first signal sample during the second cell search period contemporaneous with the storing the synchronization signal as a second signal sample;
    determining an index for the SS-RSRP estimation candidate by decoding a physical broadcast channel (PBCH) included in the synchronization signal in response to determining the synchronization signal has a center frequency of 6 GHz or more; and performing an SS-RSRP estimation operation on the SS-RSRP estimation candidate corresponding to the index, the SS-RSRP estimation operation being performed during the second SSB burst set period, and the SS-RSRP estimation operation including estimating an RSRP of a PBCH demodulation reference signal (DMRS), wherein the receiving a synchronization signal includes filtering a subset of PBCH data included in the synchronization signal received during the first SSB burst set period, the PBCH data including the PBCH DMRS, and the SS-RSRP estimation operation being performed based on PBCH data included in the synchronization signal received during the second SSB burst set period.

12. The operating method of claim 11, wherein the storing a synchronization signal as a first signal sample stores the first signal sample in a first buffer; and the storing a synchronization signal as a second signal sample stores the second signal sample in a second buffer different from the first buffer.

13. The operating method of claim 12, further comprising: storing the synchronization signal as a third signal sample in a third cell search period different from the first cell search period and the second cell search period, the third cell search period being shorter than the SSB burst set period, wherein the determining a SS-RSRP estimation candidate determines the SS-RSRP estimation candidate based on the second signal sample during the third cell search period contemporaneous with the storing the synchronization signal as a third signal sample.

14. The operating method of claim 12, wherein the determining the SS-RSRP estimation candidate comprises performing a secondary synchronization signal (SSS) search based on a result of a primary synchronization signal (PSS) search performed on the first signal sample; and the method further comprises performing a PSS search on the second signal sample during the second cell search period.

15. The operating method of claim 12, further comprising: storing data for performing the SS-RSRP estimation operation in a third buffer different from the first and second buffers.

16. The operating method of claim 11, wherein the synchronization signal includes an SSB;

the storing a synchronization signal as a first signal sample stores the first signal sample within the first SSB burst set period;

the storing a synchronization signal as a second signal sample stores the second signal sample within the first SSB burst set period; and the method further comprises storing data for performing the SS-RSRP estimation operation within the second SSB burst set period.

17. The operating method of claim 11, wherein the synchronization signal includes an SSB;

the storing a synchronization signal as a first signal sample stores the first signal sample within the first SSB burst set period;

the storing a synchronization signal as a second signal sample stores the second signal sample within the first SSB burst set period; and the method further comprises storing data for performing the SS-RSRP estimation operation within the first SSB burst set period.

18. An operating method of a communication device, comprising:

receiving a synchronization signal from a cell within first and second synchronization signal block (SSB) burst set periods;

storing the synchronization signal in a first buffer as a first signal sample in a first cell search period, the synchronization signal including a synchronization signal block (SSB), the first cell search period occurring during the first SSB burst set period longer than the first cell search period;

performing a primary synchronization signal (PSS) search on the first signal sample during the first cell search period;

storing the synchronization signal in a second buffer as a second signal sample in a second cell search period, the second buffer being different from the first buffer, the second cell search period occurring during the first SSB burst set period, the second cell search period occurring after the first cell search period;

performing a PSS search on the second signal sample during the second cell search period;

performing a secondary synchronization signal (SSS) search on the first signal sample during the performing a PSS search on the second signal sample;

determining a synchronization signal-reference signal received power (SS-RSRP) estimation candidate based on a result of the performing a SSS search on the first signal sample;

determining an index for the SS-RSRP estimation candidate by decoding a physical broadcast channel (PBCH) included in the synchronization signal in response to determining the synchronization signal has a center frequency of 6 GHz or more; and performing SS-RSRP estimation on the SS-RSRP estimation candidate corresponding to the index, the SS-RSRP estimation being performed during the second SSB burst set period, and the SS-RSRP estimation including estimating an RSRP of a PBCH demodulation reference signal (DMRS), wherein the receiving a synchronization signal includes filtering a subset of PBCH data included in the synchronization signal received during the first SSB burst set period, the PBCH data including the PBCH DMRS, and the SS-RSRP estimation being performed based on PBCH data included in the synchronization signal received during the second SSB burst set period.

19. The operating method of claim 18, wherein the synchronization signal is received in the second SSB burst set period following the first SSB burst set period; and the method further comprises storing the PBCH data within the second SSB burst set period.

20. The operating method of claim 18, further comprising: storing another subset of the PBCH data included in the synchronization signal received during the first SSB burst set period, the other subset of the PBCH data not including the filtered subset of the PBCH data.

* * * * *